Dec. 18, 1956  J. H. M. J. BOUCHEZ  2,774,191
CUTTING MACHINE

Filed Aug. 5, 1955  2 Sheets-Sheet 1

INVENTOR
Jean H. M. J. Bouchez

By Holcombe Wetherill & Brisbois
ATTORNEYS

Dec. 18, 1956    J. H. M. J. BOUCHEZ    2,774,191
CUTTING MACHINE

Filed Aug. 5, 1955    2 Sheets-Sheet 2

INVENTOR
Jean H. M. J. Bouchez

By Holcomb, Wetherill & Brisebois
ATTORNEYS

United States Patent Office 2,774,191
Patented Dec. 18, 1956

2,774,191

CUTTING MACHINE

Jean Henri Marie Joseph Bouchez, Arras, France

Application August 5, 1955, Serial No. 526,583

Claims priority, application France August 10, 1954

2 Claims. (Cl. 51—34)

My invention relates to a new machine for cutting such materials as steel bars, shaped members, metallic door frames, bricks, tiles, agglomerates, stone slabs, or other like materials, regardless of their size or cross-sections, without producing burrs.

The essential characteristic of this machine is that it comprises a rotating tool turning at high speed and mounted on a tiltable motor block supported by a carriage which is capable of translational movement along a track fixed to an appropriate framework. The tiltable motor block is provided with means for limiting the downward movement of the rotatable tool and, consequently, for regulating at will the depth of its cuts, while the pressure on the piece to be cut may be adapted to each particular cut by means of a weight, the position of which is adjustable along a support fixed to said tiltable motor block.

The arrangement of these elements is such that after the machine has been set for a certain depth of cut, the axle about which the motor block pivots is free to rotate in a direction which will lift the tool away from the work, thus permitting relief during the cutting operation in the case of excessive pressure against the piece to be cut or abnormal resistance to the cut, and leaving the tool free to follow the shape of the workpiece. This arrangement constitutes an essential feature of the invention.

In order that the invention may be clearly understood, one embodiment thereof will now be described, as shown on the accompanying drawings, purely by way of example, and without limiting the scope of the invention thereto.

Figure 1:
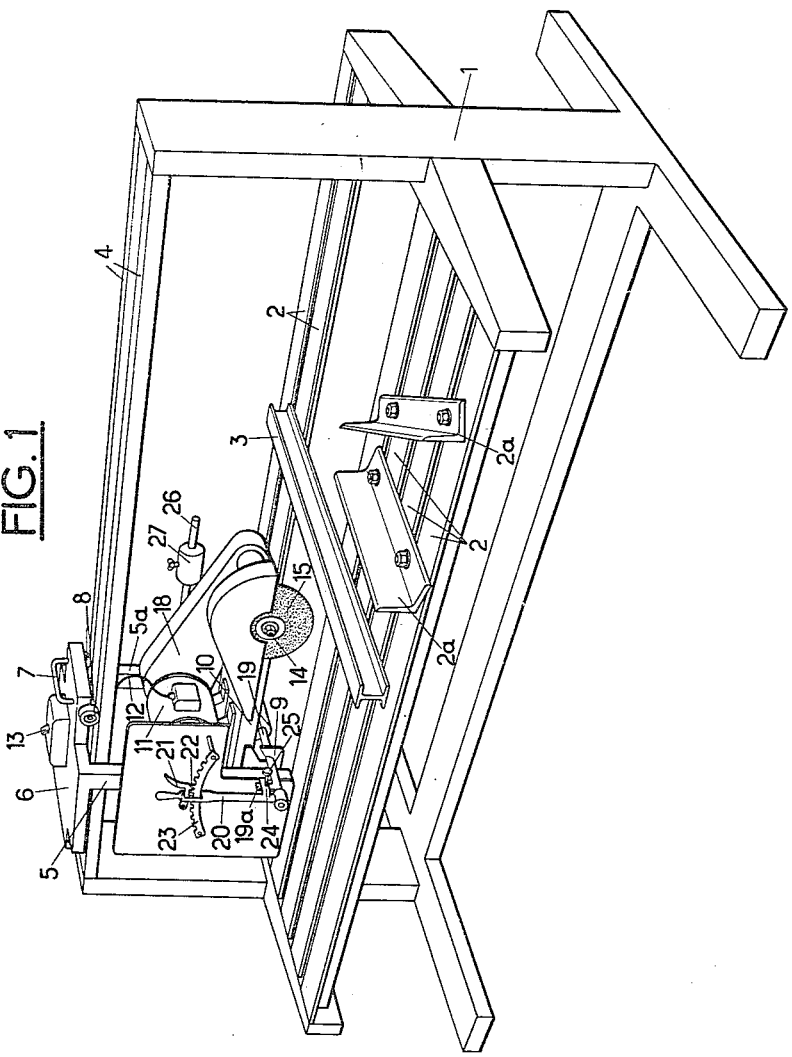
Figure 1 is a perspective assembly view showing the aforesaid embodiment of my invention.

By referring to the drawings it will be seen that the cutting machine constituting my invention comprises a frame 1 supporting a table, preferably of openwork, constituted by the elements 2, which may be fixed or movable, but are in any event so arranged as to permit the mounting of guides such as those shown at 2a for the positioning and holding of the pieces to be cut, for example an I beam 3.

The supports at the two ends of the frame are connected at their upper ends by two rails 4 which serve as a track for a carriage provided with two depending lateral arms 5 and 5a, disposed on opposite sides of the rails 4 and connected at their upper ends by a platform 6 provided with a handle 7. This platform is carried by rollers 7 which run on the rails 4.

Figure 2:
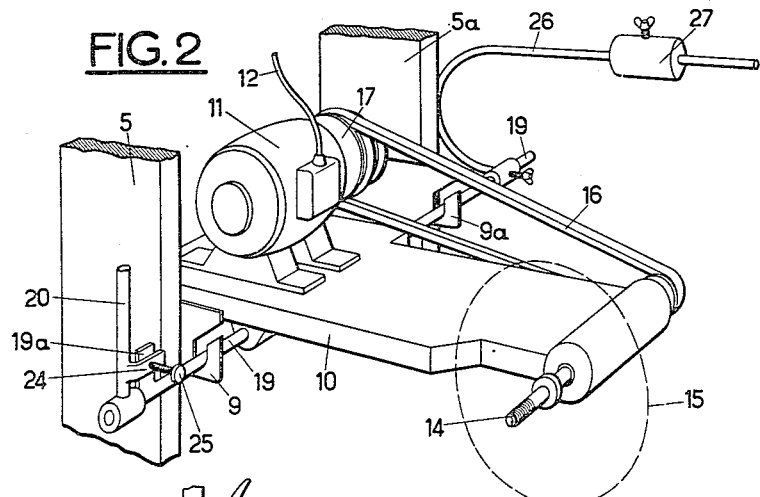
Figure 2 is another perspective view showing in detail the tiltable motor block carrying the rotatable tool.

Two brackets 9 and 9a are carried by the lower ends of the depending arms 5 and 5a respectively, and support the tiltable motor block which carries the rotatable tool as shown in detail on Figure 2. This tiltable block comprises a table 10 supporting a suitable motor 11 connected through an electric cable 12 to a switch 13 fixed, for example, on the aforesaid platform 6 (Figure 1). At the front of the table 10, a rotating tool 15 is mounted on an axle 14 turning in appropriate supports. There may be one or more tools consisting, for instance, of an abrasive or metallic disc, properly protected, and driven by the motor 11 through a suitable transmission connecting the axle 14 to a pulley wheel 17 mounted on the driveshaft of the motor 11, the transmission being housed in a suitable protective casing 18 (Figure 1).

The entire motor block is supported by a transverse shaft 19 resting freely on the brackets 9 which have already been mentioned. One end of this shaft is journaled freely in a control lever 20 carrying a spring biased handle 21 provided with a catch 22 cooperating with a curved rack 23 fixed to the arm 5. This lever is provided with a pawl 24 cooperating with a stop 19a fixed to the shaft 19.

On the end of the shaft 19 opposite the lever 20 is fixed a crossbar 26 on the upper arm of which a weight 27 is slidably mounted. The weight is provided with means for retaining it in place after it has been set at the desired position, the proper setting being determined by the pressure required for the individual cut.

Figure 3:
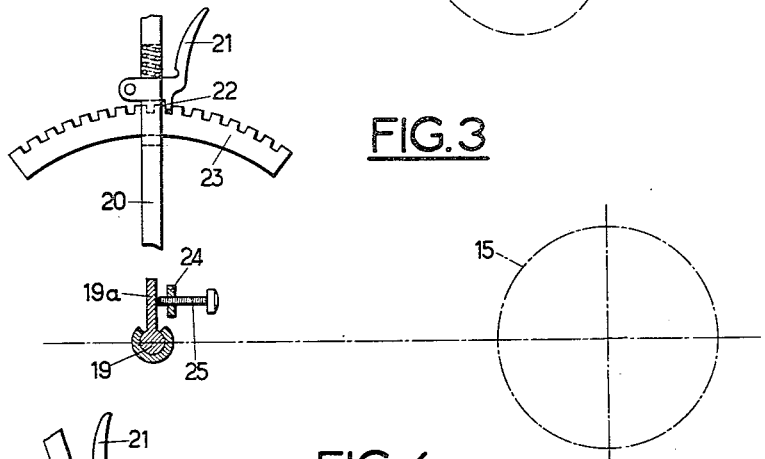
Figures 3 and 4 are detail views showing the means for regulating the depth of the cut and the pressure exerted by the rotating tool.
Figure 4:
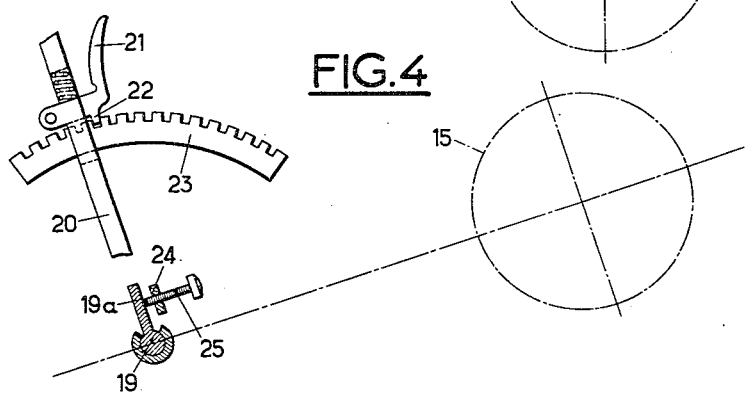

The depth of the cut is regulated by means of the lever 20 which, through its pawl 24 cooperating with the stop 19a, brings the rotating tool 15 into the precise position which it should occupy at the end of the cut; the screw 25 threaded into the pawl 24, opposite the stop 19a, permitting a very fine adjustment with or without the assistance of suitable measuring devices such as gauges, tapes and the like. By way of example, Figures 3 and 4 show the lever 20 latched to the curved rack 23 in two different positions of adjustment between the extremes permitted by the curved rack 23.

The workpiece 3 which is to be cut having been properly positioned and fastened on the table 2 and the depth of the cut and the pressure of the weight 27 having been adjusted, the cutting operation may be started by moving the carriage manually by means of the handle 7 so as to slide it along the track 4. The tool 15 then bites into the workpiece and the cut proceeds with a steady pressure assured by the weight 27 independently of the operator.

It should be noted that by reason of the freedom of the tiltable assembly to rise as hereinbefore described the tool will automatically follow, without jerking, the profile of the workpiece 3. Moreover, in the event the pressure exerted on the workpiece for any reason becomes too great, the tool will be protected by its freedom to rise. The same thing will happen if the tool encounters excessive resistance at any point during the cut.

It will of course be appreciated that the invention is not limited to the specific embodiment hereinbefore described, and that the specific details shown may be modified by the substitution of mechanical equivalents without thereby departing from the spirit of my invention. Thus, for example, the frame 1 and its table 2 may be made extensible in such a manner as to permit their size to be adjusted to that of the workpiece.

The movable carriage may be electrically, mechanically, hydromechanically, or otherwise controlled in any appropriate manner, and many other modifications may be made without departing from the spirit of my invention as defined by the following claims.

I claim:

1. A machine for cutting materials of different hardness comprising in combination a framework, a carriage slidable thereon, a rotating cutting tool and driving motor mounted on a block tiltable on a shaft journaled in said carriage, a control lever rotatably mounted on the shaft which supports the motor block, said control lever comprising a spring biased handle carrying a latch member which cooperates with a curved rack fixed to a flange on the carriage, a pawl fixed to the control lever and cooperating with an abutment on the shaft supporting the motor block for regulating the depth of the cut made by said tool, a crossbar fixed to said shaft, a weight slidably mounted on said crossbar, and means for retaining the weight in place at any desired position for adjusting the downward pressure on said tool to the kind of material being cut; said means for tiltably supporting said cutting tool permitting it to be tilted upwardly at any place in its cutting movement to relieve excessive pressure against the material being cut, to avoid abnormal resistance, or to follow the shape of the material.

2. A machine for cutting materials as set forth in claim 1 wherein the pawl and abutment are provided one with an adjustable screw bearing on a fixed part of the other for providing a fine angular adjustment between said control lever and shaft.

References Cited in the file of this patent

UNITED STATES PATENTS

| | | |
|---|---|---|
| 1,263,461 | Parker | Apr. 23, 1918 |
| 1,716,279 | Owen | June 4, 1929 |
| 1,950,264 | Perazzoli | Mar. 6, 1934 |
| 1,950,758 | Sommer et al. | Mar. 13, 1934 |
| 1,979,140 | Casey | Oct. 30, 1934 |
| 2,262,049 | Robinson | Nov. 11, 1941 |
| 2,418,737 | Talboys | Apr. 8, 1947 |
| 2,435,156 | Pealer | Jan. 27, 1948 |
| 2,581,777 | Wright | Jan. 8, 1952 |
| 2,700,256 | Lewis | Jan. 25, 1955 |
| 2,736,311 | Coates | Feb. 28, 1956 |